United States Patent
Lele et al.

(10) Patent No.: US 6,185,433 B1
(45) Date of Patent: *Feb. 6, 2001

(54) COMMUNICATION DEVICE AND METHOD FOR DETERMINING A BUSY STATUS THEREOF IN A DISPATCH SYSTEM

(75) Inventors: Kamlesh S. Lele, Pompano Beach; John M. Restrepo, Tamarac; Jeffrey T. Brady, Sunrise, all of FL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/106,596

(22) Filed: Jun. 29, 1998

(51) Int. Cl.[7] ............................... H04B 7/26; H04Q 7/20
(52) U.S. Cl. ........................ 455/528; 455/521; 455/517
(58) Field of Search ................................. 455/528, 521, 455/507, 508, 517, 518, 466, 553, 73

(56) References Cited

U.S. PATENT DOCUMENTS

| | | | |
|---|---|---|---|
| 5,287,551 | * | 2/1994 | Gustafson, Jr. et al. ............ 455/518 |
| 5,313,517 | * | 5/1994 | Inaguma ................................. 379/67 |
| 5,581,604 | * | 12/1996 | Robinson et al. ..................... 379/67 |
| 5,592,477 | * | 1/1997 | Farris et al. .......................... 370/396 |
| 5,627,875 | * | 5/1997 | Kapsales .............................. 455/414 |
| 5,638,412 | * | 6/1997 | Blakeney, II et al. ................ 455/69 |
| 5,657,372 | * | 8/1997 | Ahlberg et al. ...................... 455/414 |
| 5,768,359 | * | 6/1998 | DiPierro, Jr. et al. ............... 379/209 |

* cited by examiner

*Primary Examiner*—Nguyen Vo
*Assistant Examiner*—Eliseo Ramos-Feliciano
(74) *Attorney, Agent, or Firm*—Steven A. May; Jeffrey K. Jacobs

(57) ABSTRACT

A communication device (e.g., 103) includes a user interface (209), a receiver (203), a controller (205), and a transmitter (201). A user of the communication device uses the user interface to place the communication device in a busy operational mode in which the communication device is not involved in a voice communication, but is nevertheless unavailable to participate in a voice communication. While in the busy mode, the communication device receives a voice communication from a calling device (e.g., 104) and automatically responds with a data message indicating that the communication device is in the busy mode, thereby informing a user of the calling device of the busy status of the called device without disrupting the user of the called device.

13 Claims, 3 Drawing Sheets

COMMUNICATION DEVICE AND METHOD FOR DETERMINING A BUSY STATUS THEREOF IN A DISPATCH SYSTEM

FIELD OF THE INVENTION

The present invention relates generally to communication devices and, in particular, to determining an operational status of a communication device.

BACKGROUND OF THE INVENTION

Radio communication systems are known to include a radio communication infrastructure and mobile or portable communication devices. Some systems (e.g., cellular systems) primarily support telephone communications, while other systems (e.g., trunked or conventional systems) primarily support dispatch communications. Some systems, such as Motorola's "iDEN" system, provide multiple services, such as telephone, dispatch, data, and short message, all in a single communications platform.

Regardless of the type of system, radio users in the system occasionally need to attend meetings or be in other situations in which they do not wish to be disturbed or interrupted. Cellular systems and normal wireline telephone systems accommodate such desires by providing voice mail service to their users. However, such is currently not the case in dispatch systems. In a dispatch system, when a user wants to be uninterrupted, the user must turn off his or her radio, or mute the audio. Although such action by the user allows him or her to remain undisturbed, the action does nothing to inform the callers that he or she is active in the system, but cannot respond at the moment.

In a dispatch system, when a user turns off his or her radio and another user attempts to contact him or her, the calling user receives a message from the radio communication infrastructure, such as "TARGET NOT AVAILABLE." Such a message is indeterminate because it could mean that the called device is powered off or it could mean that the called device is powered on, but simply out of the system coverage area. Accordingly, since the user of the calling device does not know the exact status of the called device, the user of the calling device continues to attempt to contact the user of the called device. Such retries are an inefficient use of system resources when the called user's intent was to remain undisturbed anyway.

Therefore, a need exists for a communication device and method for determining an operational status thereof that permits the communication device to remain active in the system at all times and that provides determinate feedback to calling device users that are attempting to contact the communication device at times when a user of the communication device does not wish to be disturbed.

DESCRIPTION OF A PREFERRED EMBODIMENT

Generally, the present invention encompasses a communication device and method for determining an operational status thereof. The communication device includes a user interface, a receiver, a controller, and a transmitter. A user of the communication device uses the user interface to place the device in a busy operational mode in which the device is not involved in a voice communication, but is nevertheless unavailable to participate in a voice communication. While in the busy mode, the communication device receives a voice communication from a calling device and automatically responds with a data message indicating that the communication device is in the busy mode, thereby informing the user of the calling device of the busy status of the communication device. By providing a busy status indication to a calling device in this manner, the present invention enables a person calling the busy device to determine that the user of the busy device is active in the communication system, but is presently unavailable to communicate, without interrupting the user of the called device or the user's company at the time of the call. Knowing that the user of the busy mode device is unavailable because the user of the busy mode device intentionally placed the device in the busy mode, the user of the calling device can determine appropriate future action (e.g., contacting someone else) without having to repeatedly attempt to contact the user of the busy mode device.

Figure 1:
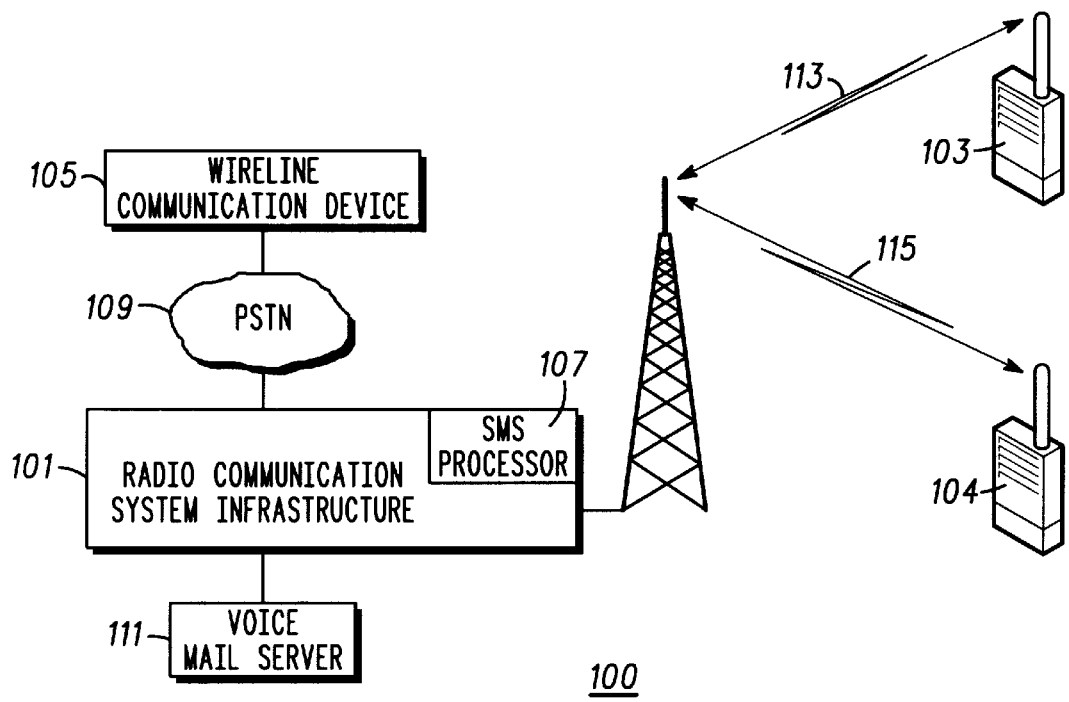
FIG. 1 illustrates a block diagram depiction of a radio communication system in accordance with a preferred embodiment of the present invention.

The present invention can be more fully understood with reference to FIGS. 1–5. FIG. 1 illustrates a block diagram depiction of a radio communication system 100 in accordance with a preferred embodiment of the present invention. The preferred radio communication system 100 includes a radio communication system infrastructure 101, at least two radio communication devices 103, 104 (two shown), at least one wireline communication device 105 (one shown), the public switched telephone network (PSTN) 109, and a voice mail server 111. The radio communication system infrastructure 101 preferably comprises "iDEN" communication system infrastructure equipment that is commercially available from Motorola, Inc. of Schaumburg, Ill. In an alternative embodiment, the radio communication system 100 might comprise any cellular or trunked communication system, such as communication systems that implement one or more of the following cellular platforms: Personal Communication Service (PCS), Advanced Mobile Phone Service (AMPS), Narrowband AMPS (NAMPS), Unites States Digital Cellular (USDC), Code Division Multiple Access (CDMA), or Global System for Mobile Communications (GSM). As depicted in FIG. 1, the radio communication system infrastructure 101 preferably includes a short message service (SMS) processor 107, such as the Telepath Short Message Service Center (SMSC) that is commercially available from Aldiscon, Inc. of Dallas, Tex.

Figure 2:
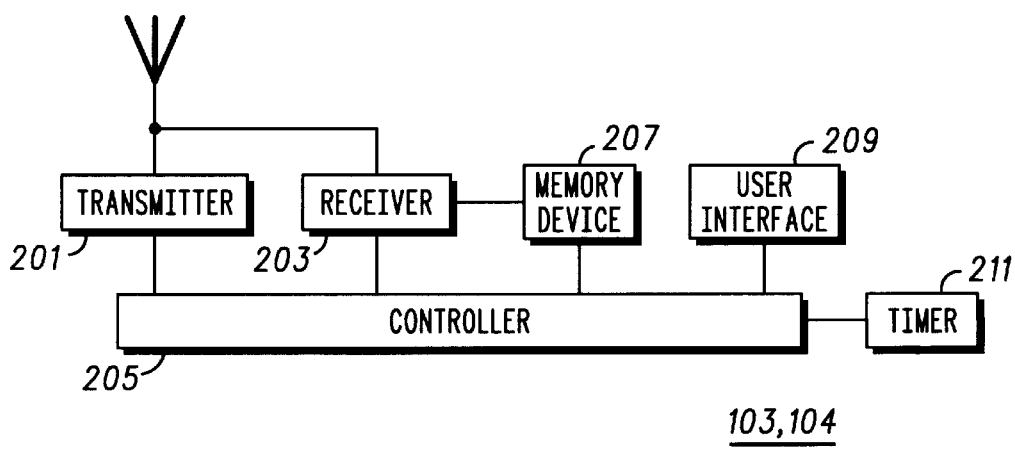
FIG. 2 illustrates a block diagram depiction of a two-way radio communication device in accordance with a preferred embodiment of the present invention.

The radio communication devices 103, 104 preferably comprise "iDEN" radiotelephones and preferably include a transmitter 201, a receiver 203, a controller 205, a memory device 207, a user interface 209, and a timer 211 as illustrated in block diagram form in FIG. 2. The transmitter 201 preferably comprises a linear transmitter capable of transmitting quadrature amplitude modulated (QAM) signals. The receiver 203 preferably comprises a digital receiver capable of receiving QAM signals. The controller 205 preferably comprises a microprocessor and its associated logic circuitry. The memory device 207 preferably comprises a random access memory (RAM) and the timer 211 preferably comprises a known digital timer. Although shown as separate elements in FIG. 2, the memory device 207 and the timer 211 preferably form respective portions of the controller 205. The user interface 209 preferably comprises a display, a keypad, menu buttons, function buttons, and/or a touch screen.

The voice mail server 111 comprises a well-known telephone voice mail system and the wireline communication device 105 comprises a telephone, a personal computer, a palm top computer, or a personal digital assistant (PDA). The PSTN 109 is well known; thus, no further discussion will be presented except as may be necessary to more fully describe the present invention.

With reference to FIGS. 1 and 2, operation of the preferred radio communication system 100 occurs substantially as follows in accordance with the present invention. When a user of a radio communication device (e.g., 103) decides that he or she cannot be disturbed for a certain duration of time, but that he or she wants to remain registered in the communication system, the user uses the user interface 209 (e.g., by scrolling down a mode menu and depressing a selection button to activate the selected mode) to place the communication device 103 in a busy operational mode. In the busy operational mode, the communication device 103 remains registered in the system, but does not disturb the user of the device 103 upon receipt of a communication.

After the communication device 103 has entered the busy mode, another communication device (e.g., radio communication device 104 or wireline communication device 105) may desire to contact the user of the busy mode communication device 103. In such a case, the calling communication device (e.g., radio communication device 104) transmits a voice communication to the busy mode device 103 via one or more radio communication resources 113, 115 and, if necessary, the radio communication system infrastructure 101 in accordance with known techniques. As contemplated by the present invention, each radio communication resource 113, 115 might comprise a radio frequency (RF) channel in a frequency division multiple access (FDMA) system, such as AMPS, one or more time slots on an RF channel in a time division multiple access (TDMA) system, such as the "iDEN" system, or an orthogonal code, such as a pseudo-noise sequence or a frequency-hopping pattern, in a CDMA system.

For example, when the calling communication device 104 and the busy mode device 103 are in a so-called talk-around mode in which the two devices 103, 104 communicate directly without interaction of the radio communication system infrastructure 101, the calling device 104 transmits the voice communication directly to the busy mode device 103 via a single communication resource without involvement of the radio communication system infrastructure 101. However, when the calling radio communication device 104 and the busy mode device 103 are not in the talk-around mode or when the calling communication device is a wireline communication device 105, the calling device transmits the voice communication to the busy mode device 103 via the radio communication system infrastructure 101 (and the PSTN 109 when the voice communication originates from a wireline communication device 105).

Once the voice communication is transmitted to the busy mode device 103, the busy mode device 103 employs its receiver 203 to receive the voice communication and alert the controller 205 that a voice communication has been received for the user of the busy mode device 103. Upon receipt of the alert, the controller 205 determines whether the communication device 103 is in the busy operational mode and whether the calling device 104 is data capable. The controller 205 determines that the communication device 103 is in the busy operational mode by monitoring the user interface 209 and detecting when the appropriate key, button, or sequence of keys and/or buttons are depressed or selected by the user of the communication device 103 to place the communication device 103 in the busy operational mode. When the controller 205 detects that such key, button, or sequence of keys and/or buttons were depressed or selected by the user, the controller 205 stores a busy mode status indication in its memory (e.g., memory device 207).

In the preferred embodiment, the sequence of key or button selections used by the user of the communication device 103 to place the communication device 103 in the busy operational mode includes a selection of the time period during which the communication device is to remain in the busy operational mode. Upon receipt of the time period selection, the controller 205 starts the timer 211. The timer 211 expires after the selected time period and the controller 205 returns the communication device 103 (e.g., by removing the busy status indication stored in memory) to its normal, non-busy operational mode in which the communication device 103 is available to participate in voice communications. In an alternative embodiment, the user of the communication device 103 might not indicate the time duration for busy mode operation. In this case, the communication device 103 remains in the busy operational mode until the user of the communication device 103 cancels such mode by selecting or depressing the appropriate key, button, or sequence of keys and/or buttons.

The controller 205 determines that the calling device 104 is data capable by determining whether the communication device 103 itself is data capable. That is, when the communication device 103 is data capable, the communication device 103 presumes that the calling device 104 is also data capable if the calling device 104 is supported by the radio communication system infrastructure 101. Similarly, when the communication device 103 is not data capable, the communication device 103 presumes that the calling device 104 is not data capable if the calling device 104 is supported by the radio communication system infrastructure 101. In accordance with the present invention, a communication device 103, 104 is data capable when it is capable of receiving short data messages, such as SMS messages, even though it may not also be capable of receiving packet data or circuit data transmissions. The controller 205 is programmed with the communication device's capabilities at a time when the communication device 103 is provisioned by the radio system operator.

When the calling device 104 is data capable and the communication device 103 is in the busy operational mode, the controller 205 generates a data message for transmission to the calling device 104 to inform the calling device 104 that the communication device 103 is in the busy operational mode. In the preferred embodiment, the controller 205 selects one of a plurality of user-defined messages stored in the memory device 207 as the data message for conveyance to the calling device 104. For example, prior to placing the communication device 103 in the busy operational mode, the user of the communication device 103 might create his or her own messages for transmission to calling communication devices when the communication device 103 is in the busy mode. Alternatively, the communication device 103 may include one or more preset or "canned" messages that the user can select from prior to placing the communication device 103 in the busy mode. In a further embodiment, the SMS processor 107 of the radio communication system infrastructure 101 might include a memory containing canned busy mode messages that are transmitted to the calling device 104 upon the radio communication system infrastructure 101 being informed by the communication device 103 that the device 103 is in the busy mode.

In addition to generating a data message, the busy mode device 103 preferably stores an identification (ID) of the calling device 104 in a memory (e.g., memory device 207) of the busy mode device 103. Upon receipt of the communication, the receiver 203 of the called device 103 extracts the ID of the calling device 104 from the communication in accordance with known techniques and the controller 205, upon detecting that the called device 103 is in the busy operational mode, instructs the receiver 203 to store the ID of the calling device 104 in the memory device 207. The user of the called device 103 can then retrieve the IDs of the communication devices 104, 105 that called the called device 103 when the called device 103 was in the busy operational mode at a later time when the called device 103 is no longer in the busy mode. In the preferred embodiment, only unique calling device IDs are stored in the memory device 207 to minimize memory size. Thus, before instructing the receiver 203 to store the calling device ID in memory, the controller 205 first scans the memory to determine whether the ID of the calling device 104 is already stored. When the ID of the calling device 104 is already stored, no additional storage is necessary. In addition to storing the calling device IDs, the called device 103 might also store the time each call was received (e.g., when the called device 103 has the capability to determine such time (e.g., when the called device 103 includes a global positioning satellite (GPS) receiver )) or the time each call was transmitted from the radio communication system infrastructure 101 (e.g., when the radio communication system infrastructure 101 timestamps each transmission).

Having determined that the called communication device 103 is in the busy mode, determined that the calling communication device 104 is data capable, and generated the data message, the controller 205 provides the data message to the transmitter 201 for transmission to the calling device 104. The transmitter 201 transmits the data message to the calling device 104 either directly or via the radio communication system infrastructure 101. In the preferred embodiment, the radio communication system infrastructure 101 includes an SMS processor 107 and the busy mode device 103 conveys the data message as a short message to the calling device 104 via the SMS processor 107 in accordance with known techniques. Once the calling device 104 receives the data message, the calling device 104 preferably displays the data message as a text message to a user of the calling device 104 to inform the user that the called device 103 is currently in the busy operational mode.

When the controller 205 determines that the calling communication device 104 is not data capable, the controller 205 further determines whether the communication is a dispatch call or a telephone call. When the communication is a telephone call, the controller 205 determines whether the busy mode device 103 has voice mail service. Such a determination may be made by querying the radio communication system infrastructure 101 or by examining the service identifications that were stored in the busy mode device 103 at the time the busy mode device 103 was provisioned in the radio communication system 100. When the busy mode device 103 has voice mail service, the busy mode device 103 automatically forwards the communication to the voice mail server 111 supporting the voice mail service for the busy mode device 103. When the communication is a dispatch call, the busy mode device 103 appears busy to the calling device 104 and the calling device 104 audibly alerts its user (e.g., using a series of beeps) that the called device 103 is in a busy mode.

Although the present invention was discussed above primarily with respect to its use in radio communication devices, the present invention is also applicable for use in and with wireline communication devices. However, the present invention is most practically utilized in dispatch radio communication systems, wherein a group of users may be attempting to contact one member of the group on a regular basis. With the present invention, the group may be informed collectively that the called device 103 is in the busy mode (e.g., via one transmission of the data message to all group members on a shared radio communication resource) or each member of the group may be so informed individually (e.g., by multiple transmissions of the data message in response to private calls).

As described above, the present invention provides a communication system in which communication device users can place their communication devices in a busy mode when they do not wish to be disturbed, but do desire to remain active in the system. In accordance with the present invention, a busy mode device informs any calling device of its busy status, preferably through an SMS message, without disturbing a user of the calling device either audibly or via a vibration. By storing each unique calling device ID, the present invention allows the busy mode device user to determine who tried to contact him or her. In addition, by all users in the system having knowledge of the busy mode feature, the present invention allows calling device users to know that, upon receiving a busy mode data message from a called device, the user of the called device has been informed of the attempted contact and will respond as soon as he or she is able to do so. Thus, in contrast to prior art approaches of turning off a communication device or muting audio (neither of which both satisfies the called device user's desire to remain in the system and informs the calling device user of the status of the called device), the present invention permits a user to leave his or her radio on in situations in which he or she does not wish to be disturbed, while knowing that attempted contacts will be logged and that calling device users are being informed of the user's current inability to communicate with them.

Figure 3:
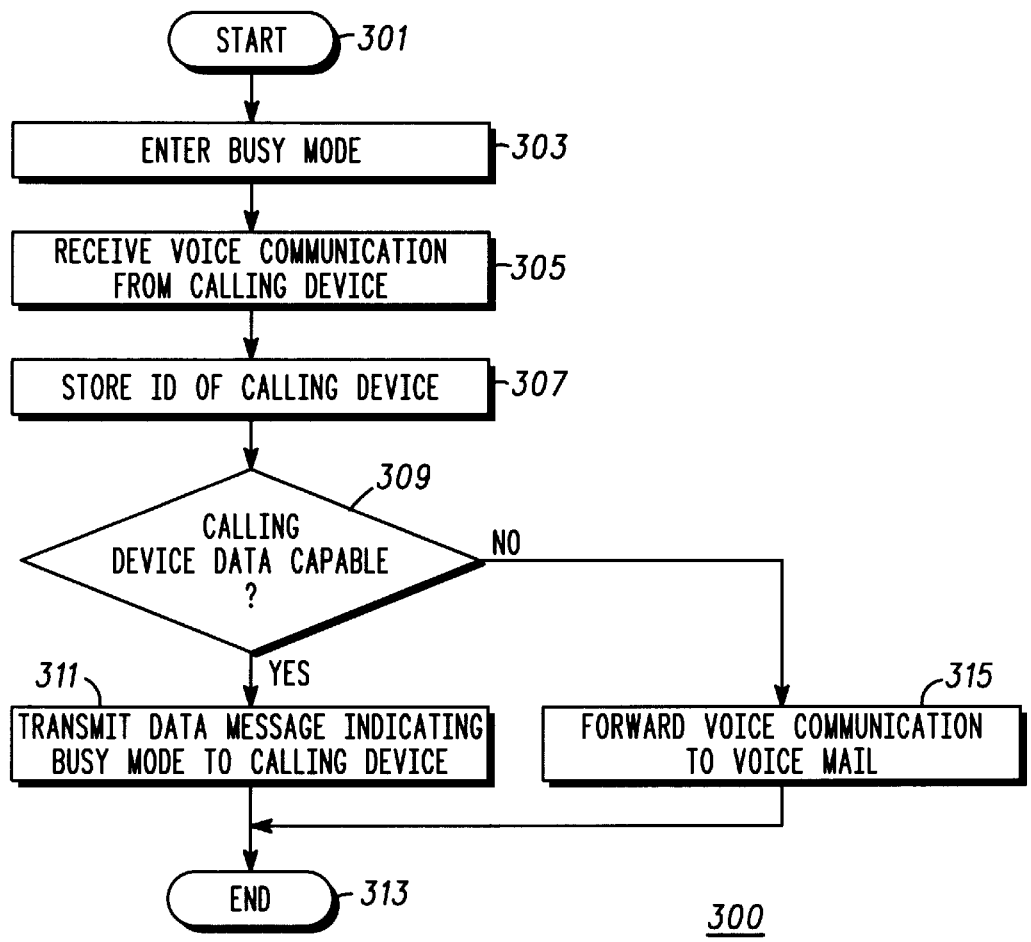
FIG. 3 illustrates a logic flow diagram of steps executed by a called communication device to inform a calling communication device of an operational status of the called communication device in accordance with a preferred embodiment of the present invention.

FIG. 3 illustrates a logic flow diagram 300 of steps executed by a called communication device to inform a calling communication device of an operational status of the called communication device in accordance with a preferred embodiment of the present invention. The logic flow begins (301) when the called device enters (303) a busy operational mode. As discussed above, the busy operational mode is an operational mode in which the called device is not involved in a voice communication, but is nevertheless unavailable to participate in a voice communication. For example, a user of the called device might configure the called device in the busy operational mode when the user of the called device is attending a meeting and cannot respond to a voice communication intended for the user.

Sometime after entering the busy operational mode, the called device receives (305) a voice communication from the calling device. The called device stores (307) the identification (ID) of the calling device for future use by the user of the called device. By storing the ID of the calling device, the called device permits the user to retrieve the ID of the calling device at a later time when it is more convenient for the user of the called device to contact the user of the calling device.

Once the voice communication has been received by the called device, the called device determines (309) whether the calling device is data capable. The called device preferably determines whether the calling device is data capable by determining whether the called device itself is data capable and presuming that when the called device is data capable, the calling device is also data capable if the calling device is supported by the same radio communication system infrastructure as is the called device.

When the called device determines that the calling device is data capable, the called device automatically transmits (311) a data message to the calling device indicating that the called communication device is in the busy operational mode. In the preferred embodiment, the data message is one of a plurality of user defined text messages prestored in the memory of the called device.

For example, the prestored message might simply say "Busy Right Now." Therefore, when the called device is in the busy mode and receives a voice communication, the called device responds with the pre-defined data message to the calling device informing the calling device that the called device is operational in the system, but that the user of the called device is busy at the moment and cannot receive the voice communication. The data message may be transmitted to the calling communication device either directly (e.g., when the two communication devices are in so-called talkaround mode) or via an infrastructure of a radio communication system (e.g., when the two communication devices are not in talkaround mode or are actively operating in a communication system supported by radio infrastructure equipment). Once the data message has been transmitted, the logic flow ends (313).

When the calling device is not data capable (309), and the voice communication is a telephone call, the called device forwards (315) the voice communication to a voice mail server for the called device if the called device has voice mail service. Forwarding of the voice communication may occur dynamically or may be predetermined. When dynamic forwarding is employed, the user of the called device is alerted (e.g., by a vibration device in the called device) that a voice communication has been received and, if the called device has a display, may be informed by the display as to the identity of the user of the calling device. Responsive to the alert, the user of the called device selects (e.g., by depressing a function key on a keypad of the called device) the destination device for forwarding, such as a secretary's telephone, a home answering machine, or a phone of another appropriate individual. When static or predetermined forwarding is employed, the user of the called device presets the forwarding destination in the radio communication system by sending a control message to the radio system infrastructure indicating that all telephone calls intended for the called device are to be forwarded to a particular destination device, such as an answering machine or a telephone of an appropriate individual.

When the calling device is not data capable and has not subscribed to voice mail service, the called device might indicate that it is in a busy operational mode by sending a preset tone pattern to the calling device which can then be audibly replayed to the user of the calling device to inform the user of the calling device that the called device is in the busy operational mode. Once the telephone call has been forwarded to voice mail or an appropriate individual, or the calling device has, in some other manner, been informed that the called device is in the busy operational mode, the logic flow ends (313).

Figure 4:
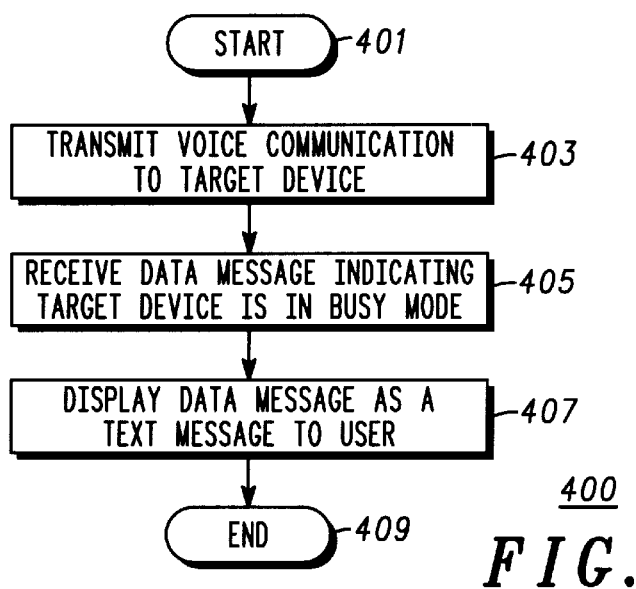
FIG. 4 illustrates a logic flow diagram of steps executed by a calling communication device to determine an operational status of a called communication device in accordance with a preferred embodiment of the present invention.

FIG. 4 illustrates a logic flow diagram 400 of steps executed by a calling communication device to determine an operational status of a called communication device in accordance with a preferred embodiment of the present invention. The logic flow begins (401) when the calling device transmits (403) a voice communication to the called or target device. Sometime later, responsive to the voice communication transmission, the calling device receives (405), either directly from the target device (e.g., when the two communication devices are in so-called talkaround mode) or via an infrastructure of a radio communication system (e.g., when the two communication devices are not in talkaround mode or are actively operating in a communication system supported by radio infrastructure equipment), a data message indicating that the target device is in a busy operational mode in which the target device is not involved in a voice communication, but is nevertheless currently unavailable to participate in a voice communication. As mentioned above, a user of the target device may put the target device in the busy operational mode when he or she wants the target device to remain active in the communication system, but does not want to be disturbed by voice activity for a certain duration of time (e.g., while the user of the target device is attending a meeting).

Upon receiving the data message, the calling device displays (407) the data message as a text message to a user of the calling communication device and the logic flow ends (409). In an alternative embodiment, when the calling device does not have a text display, the calling device may inform its user that the target device is in the busy operational mode by providing a predetermined audio signal (e.g., a series of tones or beeps) to the user of the calling device via the calling device's speaker. In yet another embodiment, when the calling device does not include a text message display, the calling device may inform its user that the target device is in the busy operational mode by converting the data message to a voice message and audibly providing the voice message (e.g., "I am busy now") to the user of the calling device via the calling device's speaker.

Figure 5:
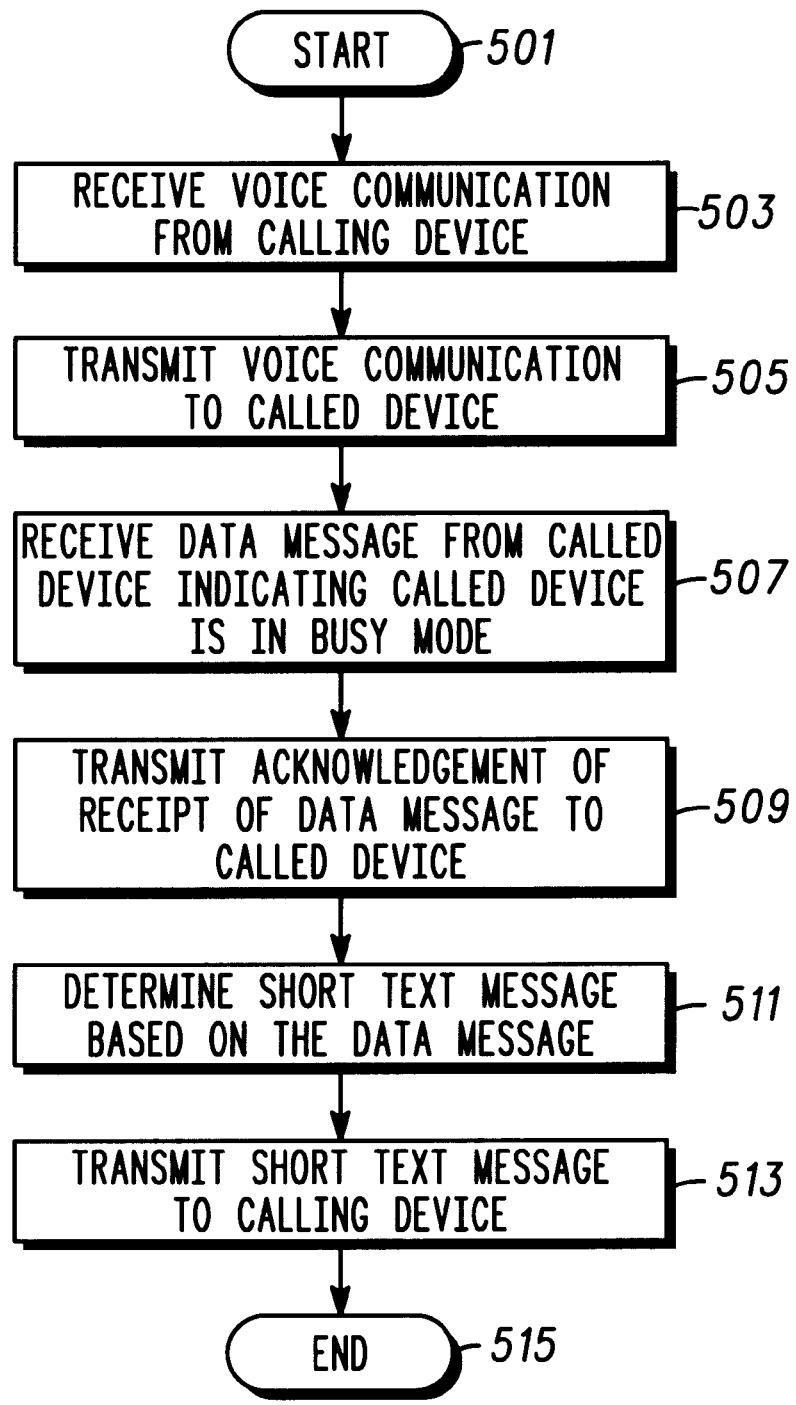
FIG. 5 illustrates a logic flow diagram of steps executed by an infrastructure of a radio communication system to inform a calling communication device of an operational status of a called communication device in accordance with the present invention.

FIG. 5 illustrates a logic flow diagram 500 of steps executed by an infrastructure of a radio communication system to inform a calling communication device of an operational status of a called communication device in accordance with the present invention. The logic flow begins (501) when the infrastructure receives (503) a voice communication from the calling device. The infrastructure transmits (505) the voice communication to the called device. When the called device is in the busy operational mode, the infrastructure receives (507) a data message from the called device indicating that the called device is in the busy operational mode. The infrastructure then transmits (509) an acknowledgment of receipt of the data message to the called device.

When the infrastructure includes a short message service (SMS) processor, the SMS processor determines (511) a short text message based on the data message received from the called device. The short text message may simply be the data message itself or may be generated from a database or lookup table in the SMS processor based on the data message. For example, the data message might comprise all ones and the database in the SMS processor might indicate that all ones translates into a text message, such as "BUSY NOW" or "DO NOT DISTURB." Once the short text message is determined, the infrastructure transmits (513) the short text message to the calling device in accordance with known techniques and the logic flow ends (515). In an alternative embodiment, when the infrastructure does not include an SMS processor, the infrastructure simply transmits the data message to the calling device.

The present invention encompasses a communication device and method for determining an operational status thereof. With such an invention, radio users can leave their radios on when attending important meetings in which they do not wish to be disturbed by voice, audible beeps, or a vibration. In addition, the present invention provides express feedback to calling device users that are attempting to contact the radio users in the meetings. In contrast to indeterminate messages, such as "TARGET NOT AVAILABLE," received by existing calling devices when a radio user is out of the system coverage area or has his or her radio turned off, the present invention provides a determinate message that allows a calling device user to know that the called device is active in the system, has been contacted, and that the user of the called device is busy, but will return their call at a later time. Accordingly, the present invention permits more efficient use of the system (less call retries by uninformed callers) and allows called users to determine, by stored ID or voice mail, who attempted to contact them while they were busy.

While the present invention has been particularly shown and described with reference to particular embodiments thereof, it will be understood by those skilled in the art that various changes in form and details may be made therein without departing from the spirit and scope of the present invention.

We claim:

1. A method for a first communication device to inform a second communication device of an operational status of the first communication device, the method comprising the steps of:

entering a busy operational mode, the busy operational mode being an operational mode in which the first communication device is not involved in a voice communication, but is nevertheless unavailable to participate in a voice communication;

while in the busy operational mode, receiving a first voice communication from the second communication device;

while in the busy operational mode and subsequent to the step of receiving the first voice communication, determining whether the second communication device is data capable; and when the second communication device is data capable, automatically transmitting, responsive to the first voice communication, a data message to the second communication device, the data message indicating that the first communication device is in the busy operational mode.

2. The method of claim 1, wherein the step of transmitting comprises the step of transmitting the data message via an infrastructure of a radio communication system.

3. The method of claim 1, wherein the step of entering comprises the step of entering the busy operational mode for a predetermined period of time.

4. The method of claim 1, wherein the data message is one of a plurality of user-defined messages stored in a memory of the first communication device.

5. The method of claim 1, wherein the step of receiving further comprises the step of storing an identification of the second communication device in a memory of the first communication device.

6. The method of claim 1, wherein the first voice communication is a dispatch call or a telephone call.

7. The method of claim 1, further comprising the step of:

when the second communication device is not data capable, automatically forwarding the first voice communication to a voice mail server for the first communication device.

8. A method for an infrastructure of a communication system to inform a first communication device of an operational status of a second communication device, the method comprising the steps of:

receiving a first voice communication from the first communication device;

transmitting the first voice communication to the second communication device;

receiving, responsive to transmission of the first voice communication, a data message from the second communication device, the data message indicating that the second communication device is in a busy operational mode, the busy operational mode being an operational mode in which the second communication device is not involved in a voice communication, but is nevertheless unavailable to participate in the first voice communication;

transmitting an acknowledgment of receipt of the data message to the second communication device; and transmitting the data message to the first communication device.

9. The method of claim 8, wherein the infrastructure of the communication system includes a short message service processor and wherein the step of transmitting the data message to the first communication device comprises the steps of:

determining, by the short message service processor, a short text message based on the data message; and transmitting the short text message to the first communication device.

10. A two-way communication device having a plurality of operational modes, the two-way communication device comprising:

a user interface that allows a user of the two-way communication device to place the two-way communication device in a busy operational mode, the busy operational mode being an operational mode in which the two-way communication device is not involved in a voice communication, but is nevertheless unavailable to participate in a voice communication;

a receiver that receives a first voice communication from a calling communication device while the two-way communication device is in the busy operational mode;

a controller, coupled to the user interface and the receiver, that detects that the two-way communication device is in the busy operational mode, that determines, while the two-way communication device is in the busy operational mode, whether the calling communication device is data capable, and, when the calling communication device is data capable, generates a data message indicating that the two-way communication device is in the busy operational mode; and a transmitter, coupled to the controller, that transmits the data message to the calling communication device, while the two-way communication device is in the busy operational mode.

11. The two-way communication device of claim 10, further comprising a memory device, coupled to the controller, having stored therein of a plurality of user-defined messages, wherein the data message is one of the plurality of user-defined messages.

12. The two-way communication device of claim 10, wherein the receiver further receives an identification of the calling communication device, the two-way communication device further comprising a memory device, coupled to the receiver, that stores the identification of the calling communication device.

13. The two-way communication device of claim 10, further comprising a timer, coupled to the controller, that starts when the two-way communication device enters the busy operational mode and expires after a predetermined period of time to thereby return the two-way communication device to a non-busy operational mode in which the two-way communication device is available to participate in a voice communication.

* * * * *